United States Patent
Bashford et al.

(10) Patent No.: US 7,254,732 B2
(45) Date of Patent: Aug. 7, 2007

(54) METHOD AND APPARATUS OF AUTOMATIC POWER MANAGEMENT CONTROL FOR SERIAL ATA DEVICE DIRECTLY ATTACHED TO SAS/SATA HOST CONTROLLER

(75) Inventors: Patrick R. Bashford, Fort Collins, CO (US); Brian A. Day, Colorado Springs, CO (US); Vetrivel Ayyavu, Norcross, GA (US); Ganesan Viswanathan, Duluth, GA (US)

(73) Assignee: LSI Corporation, Milpitas, CA (US)

( * ) Notice: Subject to any disclaimer, the term of this patent is extended or adjusted under 35 U.S.C. 154(b) by 462 days.

(21) Appl. No.: 10/901,518

(22) Filed: Jul. 29, 2004

(65) Prior Publication Data

US 2005/0005178 A1    Jan. 6, 2005

Related U.S. Application Data

(63) Continuation-in-part of application No. 10/606,138, filed on Jun. 25, 2003, now Pat. No. 7,028,199.

(51) Int. Cl.
G06F 1/26    (2006.01)
G06F 1/32    (2006.01)

(52) U.S. Cl. ............ 713/324; 713/300; 713/320; 713/322; 713/323

(58) Field of Classification Search .......... None
See application file for complete search history.

(56) References Cited

U.S. PATENT DOCUMENTS 5,564,015 A    10/1996    Bunnell
5,799,199 A    8/1998    Ito et al.
5,892,959 A    4/1999    Fung
5,974,558 A    10/1999    Cortopassi et al.
6,608,729 B1    8/2003    Willems et al.
6,725,385 B1    4/2004    Chu et al.
6,961,787 B2 *    11/2005    Ooi ........................... 710/19
6,965,956 B1 *    11/2005    Herz et al. ................. 710/74
2004/0146475 A1    7/2004    Nicholas

* cited by examiner

*Primary Examiner*—James K. Trujillo
(74) *Attorney, Agent, or Firm*—Suiter Swantz PC LLO

(57) ABSTRACT

The present invention is directed to a method and apparatus of automatic power management control for a Serial ATA device directly attached to a SAS/SATA host controller. In an exemplary aspect of the present invention, it is determined whether a Serial ATA device is directly attached to a SAS/SATA host controller without using a SAS expander. When it is determined that the Serial ATA device is directly attached to the SAS/SATA host controller, an idle or active condition of a Serial ATA interface including the Serial ATA device and the SAS/SATA host controller is automatically detected. When the Serial ATA interface is in an idle condition, idle time of the Serial ATA interface is measured using a power down counter whose frequency is determined by a programmable register based on an input clock. When a power down counter value is equal to a first value, a request for a Partial power state is asserted, and Serial ATA interface is put into a Partial power state. When a power down counter value is equal to a second value, a request for a Slumber power state is asserted, and Serial ATA interface is put into a Slumber power state.

7 Claims, 4 Drawing Sheets

METHOD AND APPARATUS OF AUTOMATIC POWER MANAGEMENT CONTROL FOR SERIAL ATA DEVICE DIRECTLY ATTACHED TO SAS/SATA HOST CONTROLLER

CROSS-REFERENCE TO RELATED DOCUMENTS

The present application is a continuation-in-part of U.S. application Ser. No. 10/606,138, entitled Method And Apparatus Of Automatic Power Management Control For Serial ATA Interface, filed Jun. 25, 2003 now U.S. Pat. No. 7,028,199, which is herein incorporated by reference in its entirety.

The present application herein incorporates U.S. patent application Ser. No. 10/901,519 entitled: "Method and Apparatus of Automatic Power Management Control for Serial ATA Interface Utilizing a Combination of IOP Control and Specialized Hardware Control" filed Jul. 29, 2004, (pending) and U.S. patent application Ser. No. 10/901,520 entitled: "Method and Apparatus of Automatic Power Management Control for Native Command Queuing Serial ATA Device" filed Jul. 29, 2004, (pending) both filed on the same day as the present patent application, by reference in their entirety.

FIELD OF THE INVENTION

This invention relates generally to power management control, and particularly to a method and apparatus of automatic power management control for a Serial ATA device directly attached to a SAS/SATA host controller.

BACKGROUND OF THE INVENTION

Serial ATA (Advanced Technology Attachment) is an evolutionary replacement for the Parallel ATA physical storage interface. Serial ATA (SATA) is a computer bus primarily designed for transfer of data between a computer processor and hard disk and has at least three advantages over Parallel ATA, namely speed, cable management, and Serial ATA's ability of being hot swappable.

There are three interface power states supported in Serial ATA: PhyReady, Partial and Slumber. In PhyReady (or power up) state, the PHY (physical) logic and main PLL (phase-locked loop) are both on and active, and the interface is synchronized and capable of receiving and sending data. Partial and Slumber are two power saving (or power down) modes. In both Partial and Slumber states, the PHY logic is powered, but is in a reduced power state. However, while the exit latency from Partial state is generally no longer than 10 µs (microseconds), the exit latency from Slumber state is generally no longer than 10 ms (milliseconds).

When a Serial ATA interface is idle (i.e., when either a Serial ATA host controller or a Serial ATA device is not active) for a period of time, it is desirable to put the interface into a power saving mode. In addition to saving power while in a power saving mode, the interface lifetime may be increased.

With the adoption of the Serial Attached SCSI (SAS) protocol, it is possible to create a SAS/SATA host controller, to which a SATA device (e.g., a SATA drive or the like) may be either directly attached or accessed through a SAS Expander via the SCSI Tunneling Protocol (STP). In other words, a SAS/SATA host controller supports both SAS and SATA, and a SATA device may be either directly attached to the SAS/SATA controller or may be attached to a SAS expander that is attached to the SAS/SATA controller. In the case where the SATA device is attached via the expander, the host controller uses the SAS STP protocol to access the device. In this case, no SATA power management is allowed per the SAS specification. On the other hand, in the case where the SATA device is directly attached to the host controller, SATA power management is allowed.

Thus, it would be desirable to provide a method and apparatus of automatic power management control for a Serial ATA device directly attached to a SAS/SATA host controller.

SUMMARY OF THE INVENTION

In an exemplary aspect of the present invention, it is determined whether a Serial ATA device is directly attached to a SAS/SATA host controller without using a SAS expander. When it is determined that the Serial ATA device is directly attached to the SAS/SATA host controller, an idle or active condition of a Serial ATA interface including the Serial ATA device and the SAS/SATA host controller is automatically detected. When the Serial ATA interface is in an idle condition, idle time of the Serial ATA interface is measured using a power down counter whose frequency is determined by a programmable register based on an input clock. When a power down counter value is equal to a first value, a request for a Partial power state is asserted, and Serial ATA interface is put into a Partial power state. When a power down counter value is equal to a second value, a request for a Slumber power state is asserted, and Serial ATA interface is put into a Slumber power state.

The apparatus of the present invention may put the Serial ATA interface into power up and power down states automatically. Because the present invention automatically detects the interface idle condition and puts the interface into a power saving mode when the interface is in idle condition for a programmable period of time, the present invention may save power and increase the interface lifetime. Moreover, because the present invention controls the power state change of the Serial ATA interface by hardware, communications with high level layers of the interface is avoided, which may lead to an efficient power saving method.

It is to be understood that both the foregoing general description and the following detailed description are exemplary and explanatory only and are not restrictive of the invention as claimed. The accompanying drawings, which are incorporated in and constitute, a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
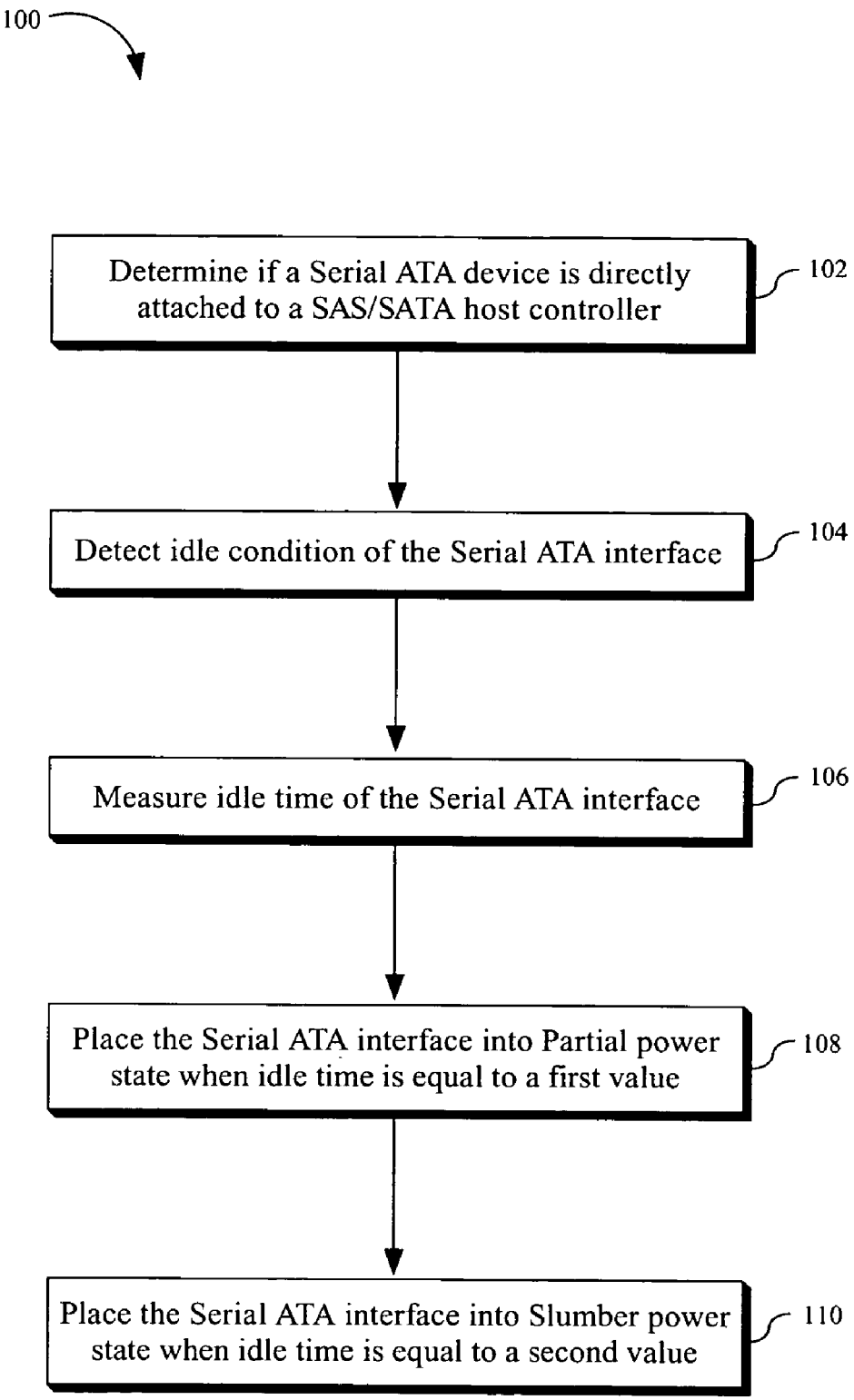
FIG. 1 is a flow diagram showing a method of automatic power management control for a Serial ATA device directly attached to a SAS/SATA host controller in accordance with an exemplary embodiment of the present invention.

Referring first to FIG. 1, a method or process 100 of automatic power management control for a Serial ATA device directly attached to a SAS/SATA host controller in accordance with an exemplary embodiment of the present invention is shown. The process 100 starts with a step 102, in which it is determined whether a Serial ATA device is directly attached (i.e., without using a SAS Expander or the like) to a SAS/SATA host controller. It is understood that a SAS/SATA host controller supports both SAS and SATA, and a SATA device may be either directly attached to the SAS/SATA controller or may be attached to a SAS expander that is attached to the SAS/SATA controller. Per the SAS standard, a block of a PHY logic of the SAS/SATA host controller may determine whether the SATA device is directly attached to the controller or whether the device is attached via a SAS Expander. Those of ordinary skill in the art will understand that other means may be used to determine whether a Serial ATA device is directly attached to a SAS/SATA host controller without departing from the scope and the spirit of the present invention. When it is determined that the Serial ATA device is directly attached to the SAS/SATA host controller, an idle condition of a Serial ATA interface including the Serial ATA device and the SAS/SATA host controller is detected 104. Next, idle time of the Serial ATA interface is measured 106. Then, the Serial ATA interface is placed into Partial power state when the measured idle time is equal to a first value 108. Next, the Serial ATA interface is placed into Slumber power state when the measured idle time is equal to a second value 110. In a preferred embodiment of the present invention, the second value is always greater than the first value. That way, when both power saving modes are supported and enabled, the present invention ensures that the Serial ATA interface is first placed into Partial State, followed by Slumber. It is understood that other embodiments may be contemplated by a person of ordinary skill in the art without departing from the scope and spirit of the present invention. For example, in an alternative embodiment of the steps 106 and 108, the Serial ATA interface may be placed into a power saving mode when the measured idle time is equal to a predetermined value, wherein the power saving mode is either a Partial power state or a Slumber power state.

Figure 2:
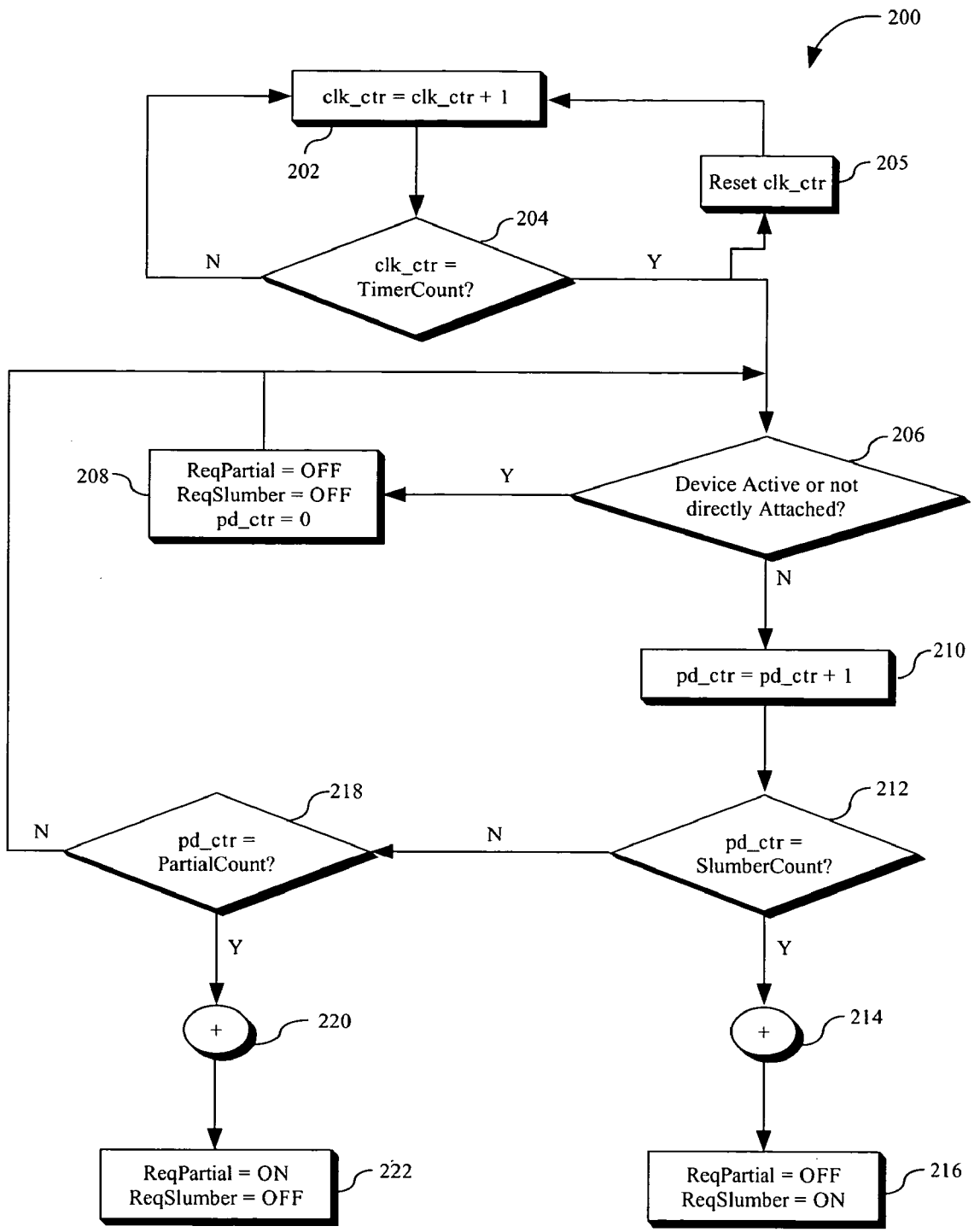
FIG. 2 is a flow diagram showing a method of automatic power management control for a Serial ATA device directly attached to a SAS/SATA host controller in accordance with a further exemplary embodiment of the present invention.

Referring to FIG. 2, a method or process 200 of automatic power management control for a Serial ATA device directly attached to a SAS/SATA host controller in accordance with a further exemplary embodiment of the present invention is shown. According to the present invention, there may be three programmable registers: Timer Count Reg, Partial Count Reg, and Slumber Count Reg. Timer Count Reg holds a programmable value TimerCount, which determines the frequency for a power down counter (pd_ctr). For example, based on the frequency of the input clock, Timer Count Reg may be programmed accordingly to obtain the time period such as 1 ms, 2 ms, or the like for the pd_ctr. Partial Count Reg holds a programmable non-zero value PartialCount. When a pd_ctr value is equal to PartialCount, a request for Partial state (ReqPartial) is asserted. Slumber Count Reg holds a programmable non-zero value SlumberCount. When a pd_ctr value is equal to SlumberCount, a request for Slumber state (ReqSlumber) is asserted.

According to process 200, an input clock counter (clk_ctr) counts the clock (step 202) and checks against TimerCount (step 204) to generate the required frequency to operate the pd_ctr. In step 204, when the clk_ctr value is equal to TimerCount, process 200 proceeds to steps 205 and 206 simultaneously. In step 205, the counter clk_ctr is reset, and process 200 then returns to step 202.

In step 206, it is determined whether a Serial ATA device is directly attached (i.e., without using a SAS Expander or the like) to a SAS/SATA host controller. In step 206, when it is determined that the Serial ATA device is directly attached to the SAS/SATA host controller, an idle/active condition of an Serial ATA interface including the Serial ATA device and the SAS/SATA host controller is also automatically detected. According to one aspect of the present invention, the interface is active if any of the following conditions is true: (1) BSY, DRQ, or ERR bit of ATA task file register is ON; (2) COMWAKE or COMRESET OOB (out of band) signal is detected; and (3) firmware is forcing the interface wakeup from a power saving mode by writing a Firmware Forcing WakeUp bit in automatic power management circuitry. If none of the foregoing conditions is true, then the interface is not active (i.e., idle).

When the interface is detected to be active or the Serial ATA device is not directly attached, process 200 proceeds to step 208, in which any power down requests (ReqPartial and/or ReqSlumber) are de-asserted and the pd_ctr is reset. After step 208, process 200 returns to step 206.

When the interface is detected to be inactive and the Serial ATA device is directly attached, process 200 proceeds to step 210, in which the pd_ctr starts to count the interface idle time. Next, in step 212, the pd_ctr value is checked against SlumberCount. If the pd_ctr value is equal to SlumberCount, then in step 214, Slumber Request may be received. Next, in step 216, ReqSlumber is ON (asserted), and ReqPartial is OFF (not asserted). Thus, the interface may be placed into Slumber state.

Following step 212, if the pd_ctr value is not equal to SlumberCount, then in step 218, the pd_ctr value is checked against PartialCount. If the pd_ctr value is not equal to PartialCount, process 200 returns to step 206. If the pd_ctr value is equal to PartialCount, then in step 220, Partial Request may be received. Next, in step 222, ReqPartial is ON (asserted), and ReqSlumber is OFF (not asserted). Thus, the interface may be placed into Partial state.

In a preferred embodiment of the present invention, SlumberCount is always greater than PartialCount. Thus, when both power saving modes are supported and enabled, the present invention ensures that ReqPartial is asserted first, followed by a ReqSlumber. It is understood that other embodiments may be contemplated by a person of ordinary skill in the art without departing from the scope and spirit of the present invention.

Figure 3:
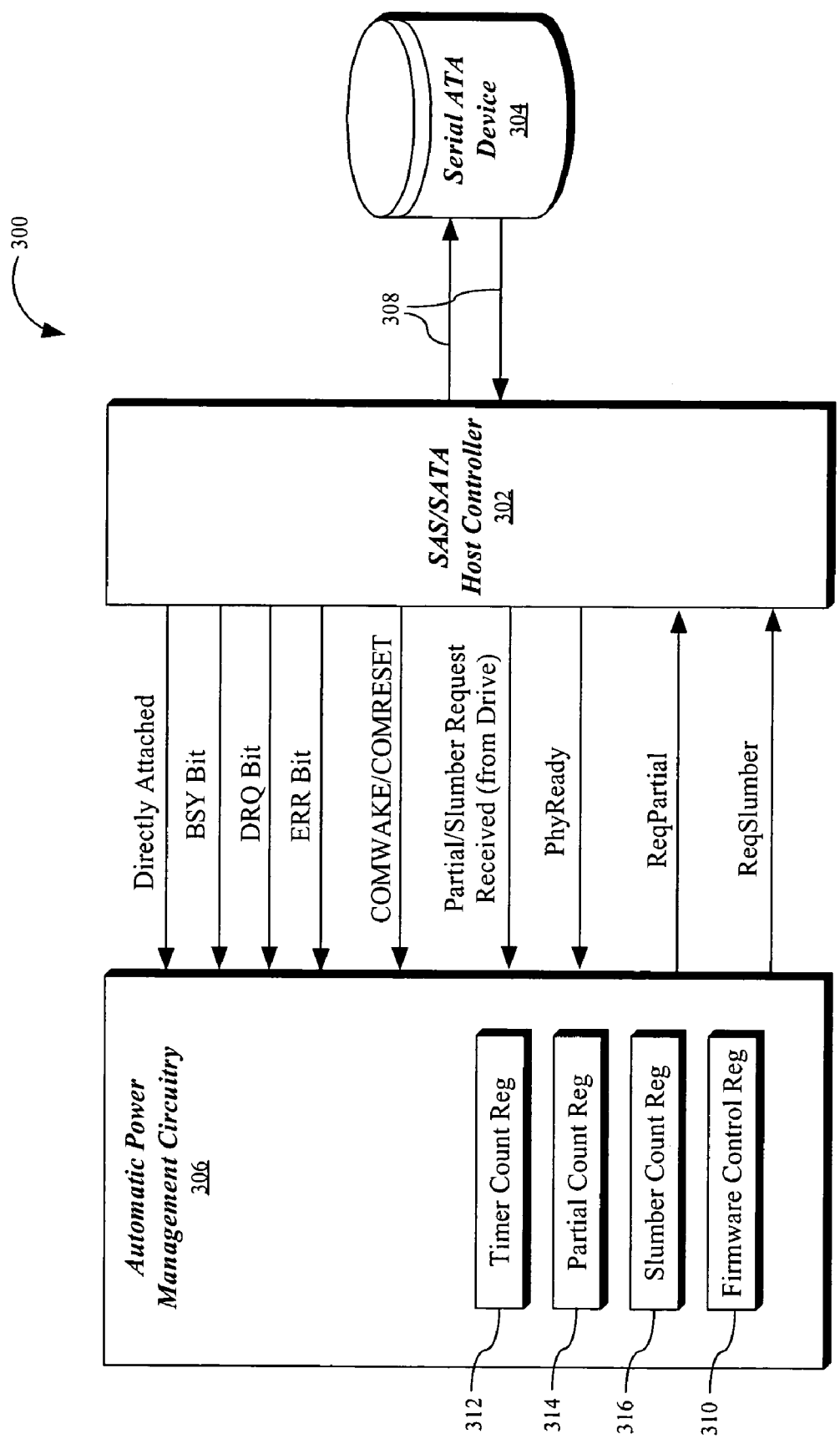
FIG. 3 is a schematic block diagram illustrating an apparatus of automatic power management control for a Serial ATA interface in accordance with an exemplary embodiment of the present invention, wherein the apparatus includes a serial ATA device, a SAS/SATA host controller, and automatic power management circuitry in accordance with an exemplary embodiment of the present invention.

FIG. 3 is a schematic block diagram illustrating an apparatus 300 of automatic power management control for a Serial ATA interface in accordance with an exemplary embodiment of the present invention. The method 100 shown in FIG. 1 and the method 200 shown in FIG. 2 may be implemented and executed by the apparatus 300. The apparatus 300 includes a SAS/SATA host controller 302, a Serial ATA device 304, and automatic power management circuitry 306. The SAS/SATA host controller 302 supports both SAS and SATA, and a SATA device may be either directly attached to the SAS/SATA controller 302 or may be attached to a SAS expander that is attached to the SAS/SATA controller 302. In FIG. 3, the Serial ATA device 304 is shown to be directly attached to the SAS/SATA host controller 302 via Serial ATA cables 308. Those of ordinary skill in the art will understand that the Serial ATA host controller 302 and the Serial ATA device 304 each have its own physical (PHY), link, transport, and application layers (not shown).

In an exemplary embodiment, the automatic power management circuitry 306 may include a Firmware Control Reg 310 and three programmable registers (Timer Count Reg 312, Partial Count Reg 314, Slumber Count Reg 316). In a preferred embodiment, the Firmware Control Reg 310 is a 32-bit register, whose Bit0 is a Firmware Forcing Slumber bit, Bit1 is a Firmware Forcing Partial bit, and Bit2 is a Firmware Forcing WakeUp bit. The automatic power management circuitry 306 detects the active/idle condition of the Serial ATA host controller 302 through BSY, DRQ, and ERR Bits and may issue power down requests (ReqPartial and ReqSlumber) to the physical layer of the Serial ATA host controller 302. The automatic power management circuitry 306 may also issue ReqPartial and/or ReqSlumber to the physical layer of the Serial ATA host controller 302 when it receives power down requests from the Serial ATA device 304.

It is understood that FIG. 3 is intended as an example of apparatus of automatic power management control for a Serial ATA interface in accordance with the present invention and not as an architectural limitation to the present invention. Those of ordinary skill in the art will appreciate that various combinations and arrangements may be employed without departing from the scope and spirit of the present invention. For example, the SAS/SATA host controller 302 in FIG. 3 may be directly connected to more than one Serial ATA device. In one embodiment, a SAS/SATA host controller may have two ports Port 1 and Port 2, which are connected to Serial ATA devices Device 1 and Device 2, respectively. In this case, according to the present invention, for each port there may be independent, identical automatic power management circuitry. If Port 1 of the host controller and Device 1 are in idle state, then only Port 1 and Device 1 may be put into a power saving state, but not Port 2 and Device 2 (assuming Port 2 and Device 2 are in active state). In addition, the Timer Count Reg 312, the Partial Count Reg 314, the Slumber Count Reg 316, and the Firmware Control Reg 310 may be physically located outside the automatic power management circuitry 306.

Figure 4:
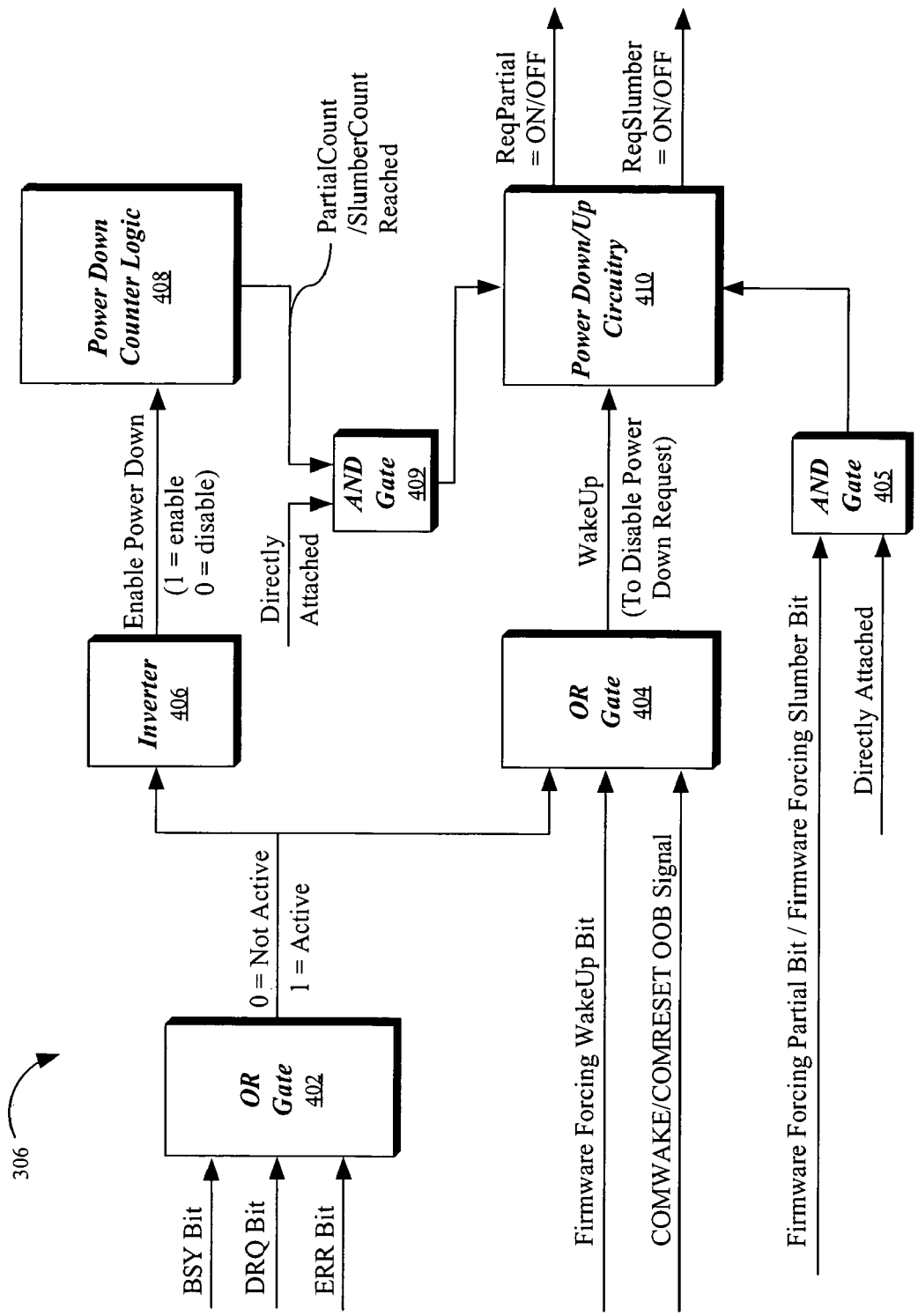
FIG. 4 is a schematic block diagram illustrating an exemplary embodiment of the automatic power management circuitry shown in FIG. 3 in accordance with an exemplary embodiment of the present invention, wherein the Timer Count Reg, the Partial Count Reg, the Slumber Count Reg, and the Firmware Control Reg are not shown.

FIG. 4 is a schematic block diagram illustrating an exemplary embodiment of the automatic power management circuitry 306 shown in FIG. 3 in accordance with an exemplary embodiment of the present invention, wherein the Timer Count Reg, the Partial Count Reg, the Slumber Count Reg, and the Firmware Control Reg are not shown. The method 100 shown in FIG. 1 and the method 200 shown in FIG. 2 may be implemented in the automatic power management circuitry 306. The circuitry 306 may include a first OR gate 402, a second OR gate 404, a first AND gate 405, an inverter 406, power down counter logic 408 (for counting idle time of a SAS/SATA host controller and comparing a power down counter value against PartialCount/SlumberCount), a second AND gate 409, and power down/up circuitry 410 (for issuing a power down or power up request to the SAS/SATA host controller physical layer).

The OR gate 402 receives BSY Bit, DRQ Bit, and ERR Bit as input and outputs a value ("1" or "0", where "1" means a Serial ATA host controller is active, and "0" means a SAS/SATA host controller is not active) to both the inverter 406 and the OR gate 404 as input. When the OR gate 402 outputs "0", a SAS/SATA host controller is not active, the inverter 406 outputs "1" which enables the power down counter logic 408. When the power down counter value reaches PartialCount or SlumberCount, and when the Serial ATA device is directly attached, as indicated by the output of the AND gate 409, the power down/up circuitry 410 issues a power down request to the Serial ATA Physical Layer. Consequently, a power down state of the SAS/SATA host controller may result.

The OR gate 404 receives as input an output from the OR gate 402, a Firmware Forcing WakeUp Bit, and an COMWAKE or COMREST OOB signal and may output a WakeUp signal to the power down/up circuitry 410, which in turn issues a power up request to the Serial ATA Physical Layer. Consequently, a power up state of the SAS/SATA host controller may result.

In addition, as indicated by the output of the AND gate 405, when the Serial ATA device is directly attached, a Firmware Forcing Partial Bit or a Firmware Forcing Slumber Bit may enable the power down/up circuitry 410 to issue a power down request to the Serial ATA Physical Layer, resulting in a power down state of the SAS/SATA host controller.

The present invention may place a Serial ATA interface into power up and power down states automatically by its own. The apparatus of the present invention may automatically detect the interface idle condition and put the interface into a power saving mode when the interface is in idle condition for a programmable period of time. Thus, the present invention may save power and increase the interface lifetime. Moreover, because the present invention controls the power state change of the Serial ATA interface by hardware, communications with high level layers of the interface is avoided, which may lead to an efficient power saving method.

It is appreciated that the present invention is not limited to a Serial ATA interface. The present invention may also apply to a variety of other interfaces as may be contemplated by a person of ordinary skill in the art.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus, comprising:
   means for determining whether a Serial ATA device is directly attached to a SAS/SATA host controller without using a SAS expander;
   a counter, communicatively coupled to said means for determining, for counting idle time of a Serial ATA interface including said Serial ATA device and said SAS/SATA host controller when said Serial ATA device is directly attached to said SAS/SATA host controller;
   a first programmable register holding a first value, said first programmable register communicatively coupled to said counter;
   a second programmable register holding a second value, said second programmable register communicatively coupled to said counter;
   automatic power management circuitry communicatively coupled to said Serial ATA interface; and
   a third programmable register programmed based on input clock to determine frequency of said counter,
   wherein said automatic power management circuitry issues a request for Partial power state to a physical layer of said Serial ATA interface when a value of said counter is equal to said first value, and issues a request for Slumber power state to a physical layer of said Serial ATA interface when a value of said counter is equal to said second value.

2. apparatus of claim 1, wherein said means for determining is a block of a PfIY logic of said SAS/SATA host controller.

3. The apparatus of claim 1, wherein said second value is greater than said first value.

4. The apparatus of claim 1, wherein said automatic power management circuitry comprising:
   a first OR logic gate receiving BSY Bit, DRQ Bit and ERR Bit as input and outputting a third value indicating said Serial ATA interface being idle or active;
   an inverter logic gate receiving said third value as input and outputting a fourth value to power down counter logic comprising said counter, wherein said Serial ATA interface being idle enables said power down counter logic to count down said idle time; and
   power down/up circuitry communicatively coupled to said power down counter logic, wherein said power down/up circuitry issues a request for Partial power state to said physical layer of said Serial ATA interface when a value of said counter is equal to said first value and when said Serial ATA device is directly attached to said SAS/SATA host controller, and issues a request for Slumber power state to said physical layer of said Serial ATA interface when a value of said counter is equal to said second value and when said Serial ATA device is directly attached to said SAS/SATA host controller.

5. The apparatus of claim 4, wherein when said Serial ATA device is directly attached to said SAS/SATA host controller, a Firmware Forcing Partial Bit enables said power down/up circuitry to issue a request for Partial power state to said physical layer of said Serial ATA interface, and a Firmware Forcing Slumber Bit enables said power down/up circuitry to issue a request for Slumber power state to said physical layer of said Serial ATA interface.

6. apparatus of claim 5, wherein said Firmware Forcing Partial Bit and said Firmware Forcing Slumber Bit are stored in a fourth register.

7. The apparatus of claim 4, wherein said automatic power management circuitry further comprising:
   a second OR logic gate receiving said third value, Firmware Forcing WakeUp Bit, and a COMWAKE or COMRESET OOB signal as input, wherein said second OR logic gate outputs a WakeUp signal for disabling a power down request to said power down/up circuitry when said third value indicates said Serial ATA interface is active, said Firmware Forcing WakeUp Bit is written in said automatic power management circuitry, and/or said COMWAKE or COMRESET OOB signal is detected;
   wherein said power down/up circuitry de-asserts a power down request when said power down/up circuitry receives said WakeUp signal.

* * * * *